United States Patent [19]
Burk

[11] 4,086,731
[45] May 2, 1978

[54] PLATE HOLD-DOWN DEVICE FOR ABRASIVE CUTTING OF METAL PLATES

[75] Inventor: David L. Burk, Pittsburgh, Pa.

[73] Assignee: Allegheny Ludlum Industries, Inc., Pittsburgh, Pa.

[21] Appl. No.: 758,256

[22] Filed: Jan. 10, 1977

[51] Int. Cl.² .............................................. B24B 41/06
[52] U.S. Cl. .................................... 51/216 R; 51/37;
100/211; 269/22; 83/451; 83/461
[58] Field of Search ................. 51/216 R, 37; 269/22;
100/211; 239/208; 138/118 R; 83/451, 461

[56] References Cited
U.S. PATENT DOCUMENTS

| | | | |
|---|---|---|---|
| 2,975,476 | 3/1961 | Burke | 100/211 X |
| 3,035,779 | 5/1922 | Convis | 239/208 |
| 3,248,001 | 4/1966 | McGinnis | 100/211 UX |
| 3,700,226 | 10/1972 | Mrugaia | 269/22 |

FOREIGN PATENT DOCUMENTS 1,274,955  9/1961  France .................. 100/211

*Primary Examiner*—Harold D. Whitehead
*Attorney, Agent, or Firm*—Vincent G. Gioia; Robert F. Dropkin

[57] ABSTRACT

A plate hold-down device for use during the abrasive cutting of plates which includes an expansible and retractable member adapted to be filled with a liquid and placed onto the plate.

9 Claims, 5 Drawing Figures

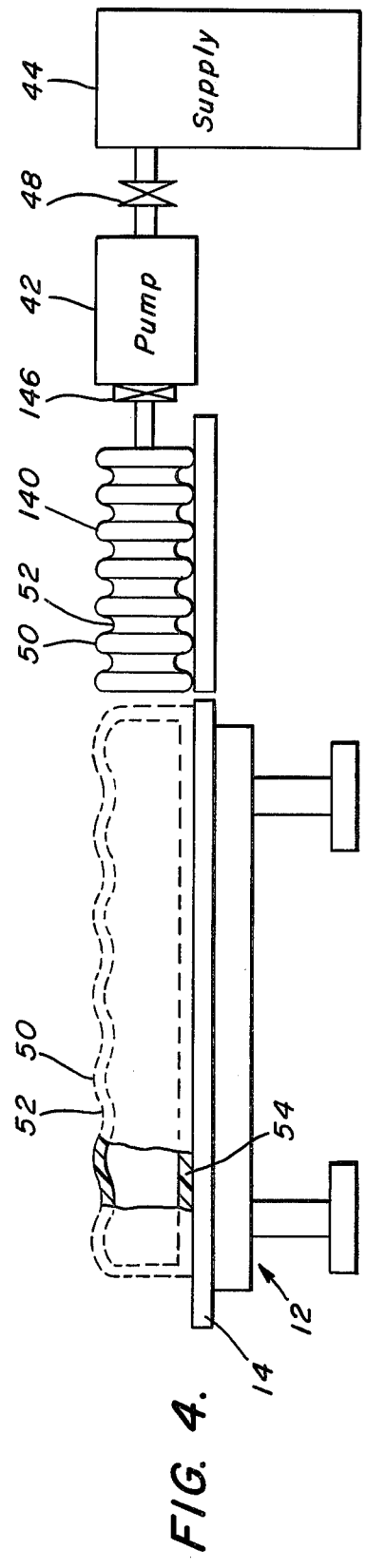
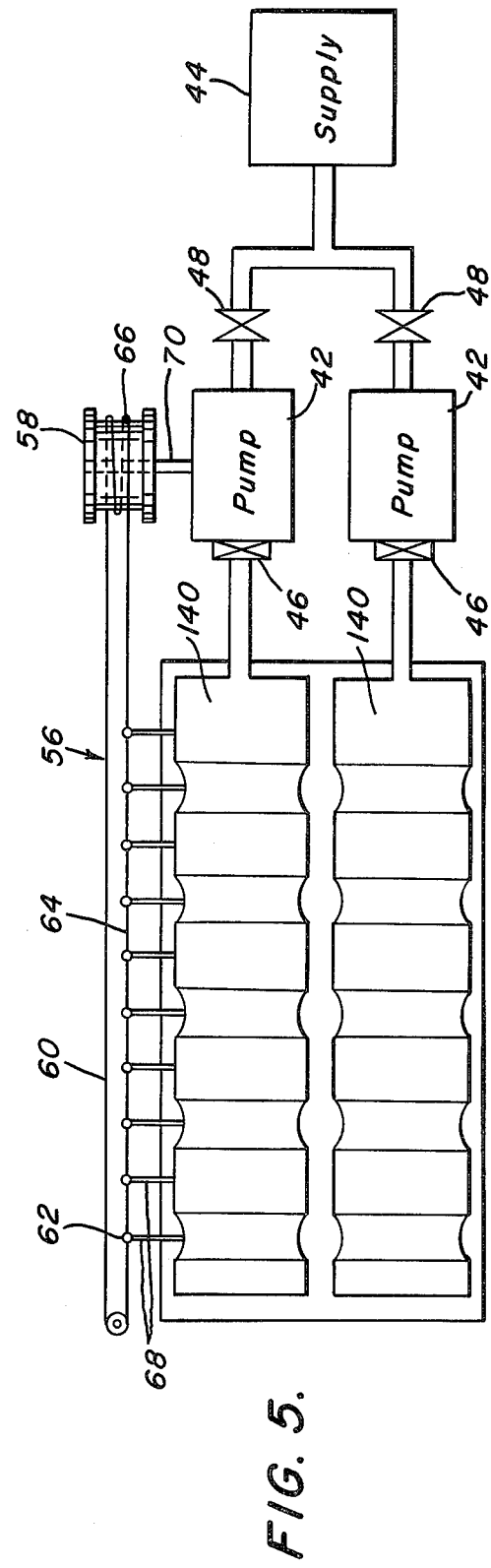

PLATE HOLD-DOWN DEVICE FOR ABRASIVE CUTTING OF METAL PLATES

BACKGROUND OF THE INVENTION

This invention relates to a plate hold-down and vibration suppression device adapted for positioning close to and uniformly along a line of cut. More particularly, the invention is concerned with a plate hold-down member which can be positioned parallel to the line of cut and which will eliminate or reduce vibrations in the plate.

In order to cut a plate with an abrasive cutting wheel, it is desirable that the plate be as flat as possible so as to avoid plate vibrations.

Heretofore, the plate was edge clamped onto the work table. Another method of holding the plate onto the table was by means of a heavy weight which was transported to the work table by a crane and placed onto the plate prior to cutting. Some of the problems in connection with the abrasive cutting of plates is that even with the use of edge clamps or a heavy weight there is an inadequate and unsatisfactory hold-down of the plate along the cutting line. This results in plate vibration which causes excessive abrasive wheel wear and/or slow cutting rates.

The life of the cutting blade is decreased due to plate vibrations. In addition, because of the bouncing of the plate during cutting, an uneven or non-smooth cut can result. The edge clamps which are used to clamp the plate down also have a tendency to mar the surface of the plate. When the plate is clamped, it is generally difficult to remove all of the bows in the plate. Plates with bows or wavy patterns must also be weighted down by heavy weights which can only be transported by means of a heavy crane. This requires a great deal of excess floor space in order to move the crane into and out of position so as to place the weights onto the plate.

One purpose of the invention is to provide a plate hold-down member which will prevent plate vibration by massive loading of the plate distributed over much of its surface and thereby absorb and damp plate vibrations.

Another purpose of the invention is to provide for a plate hold-down member which will not mar or deface the surface of the plate.

A further purpose of the invention is to provide means for rapidly applying and removing a load without the use of a crane.

Another purpose is to reduce the wear of the abrasive cutting wheel.

In order to accomplish the foregoing purposes and object, the invention provides for a flexible expansible and retractable liquid tight container which can be readily and simply placed onto the plate. The container is attached to a pump and source of liquid supply. The container is filled with a liquid, and as it is being filled it expands and moves out along the plate. The container is expanded so that it extends along the entire length of the plate onto the table. By suitable arrangements, it is possible to position the liquid-filled container close to and parallel to the cutting line.

Depending upon the size of the plate and the width of the container, one or more expansible containers can be used for placement on top of the plate to hold the plate down and prevent vibration. The filled containers will provide the massive, distributed, vibration absorbing hold down on the cutting table. In addition, for thinner plates, the weight of the liquid-filled container will remove much of the bow of the plate.

Other advantages and the nature of the invention will become readily apparent from the detailed description of the invention and the drawings thereof in which a preferred mode and embodiment thereof is disclosed.

BRIEF DESCRIPTION OF THE DRAWINGS

FIG. 4 is a modification of the flexible expansible and retractable container of FIG. 1 and shows a bellows-type container. The container is shown in its retracted condition in full outline and in its expanded condition in dotted outline.

FIG. 5 is a horizontal schematic view and is a further modification of the FIGS. 1 to 4 embodiments. FIG. 5 shows flexible expansible and retractable containers arranged in a side by side relationship for use with wide plates.

DETAILED DESCRIPTION OF THE PREFERRED EMBODIMENTS

Figure 1:
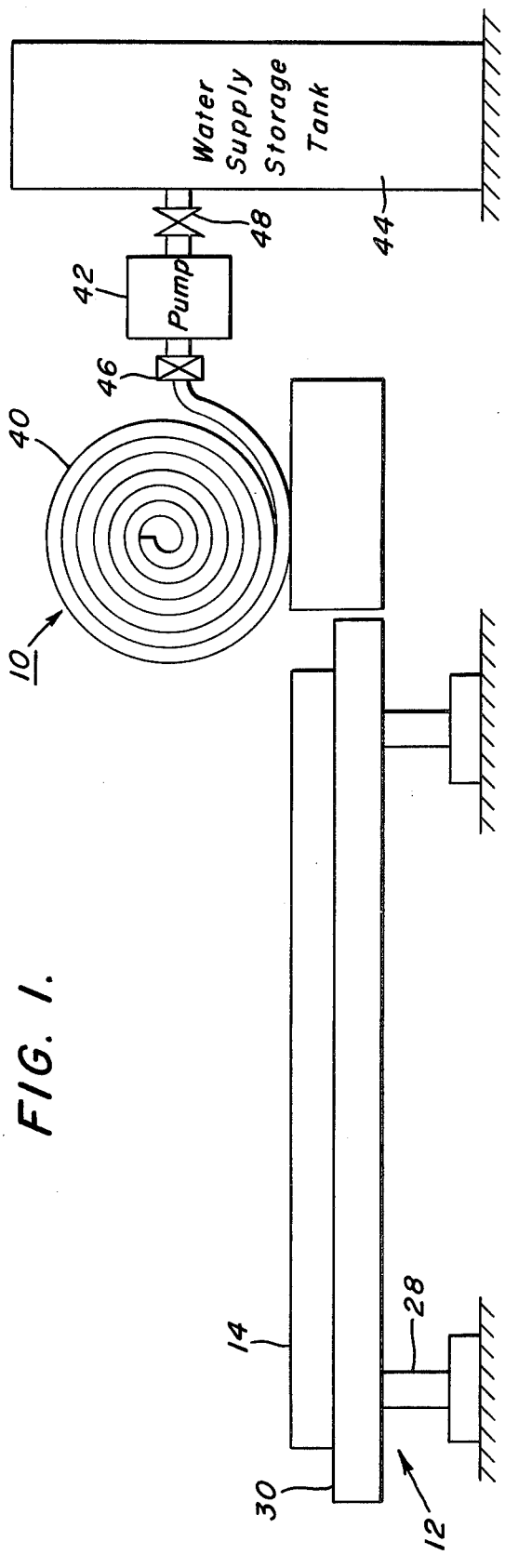
FIG. 1 is a vertical schematic view of the plate hold down device in accordance with the invention showing the flexible expansible and retractable container in its retracted condition.
Figure 2:
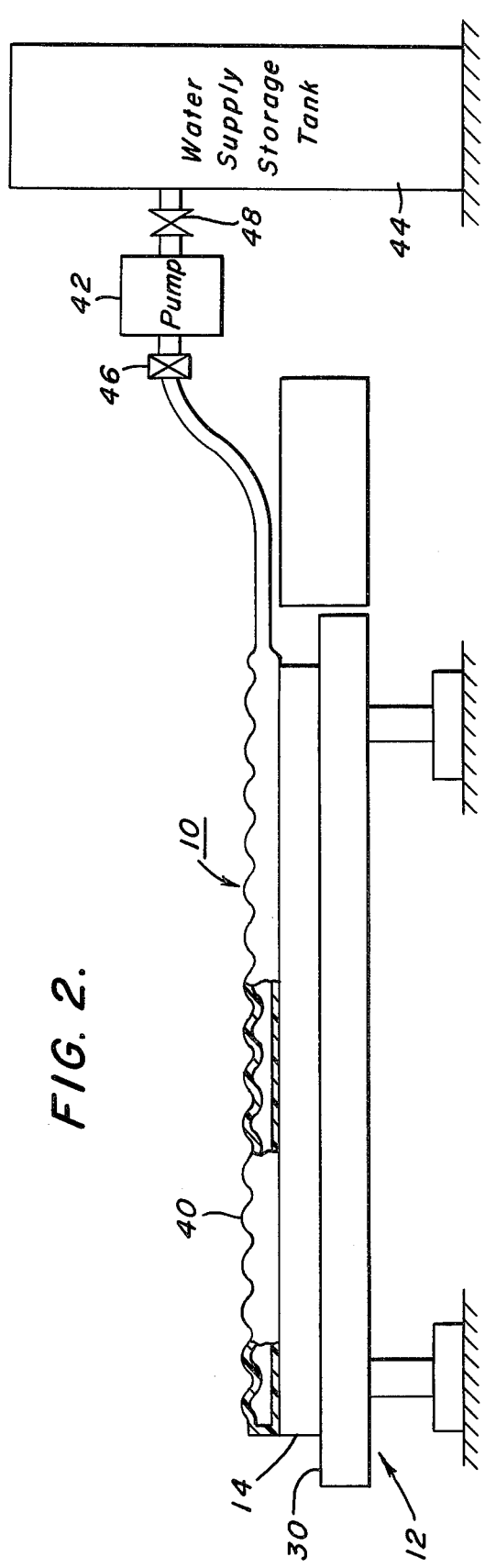
FIG. 2 is a vertical schematic view showing the flexible container in its expanded condition. The container is shown in its expanded condition filled with a liquid.
Figure 3:
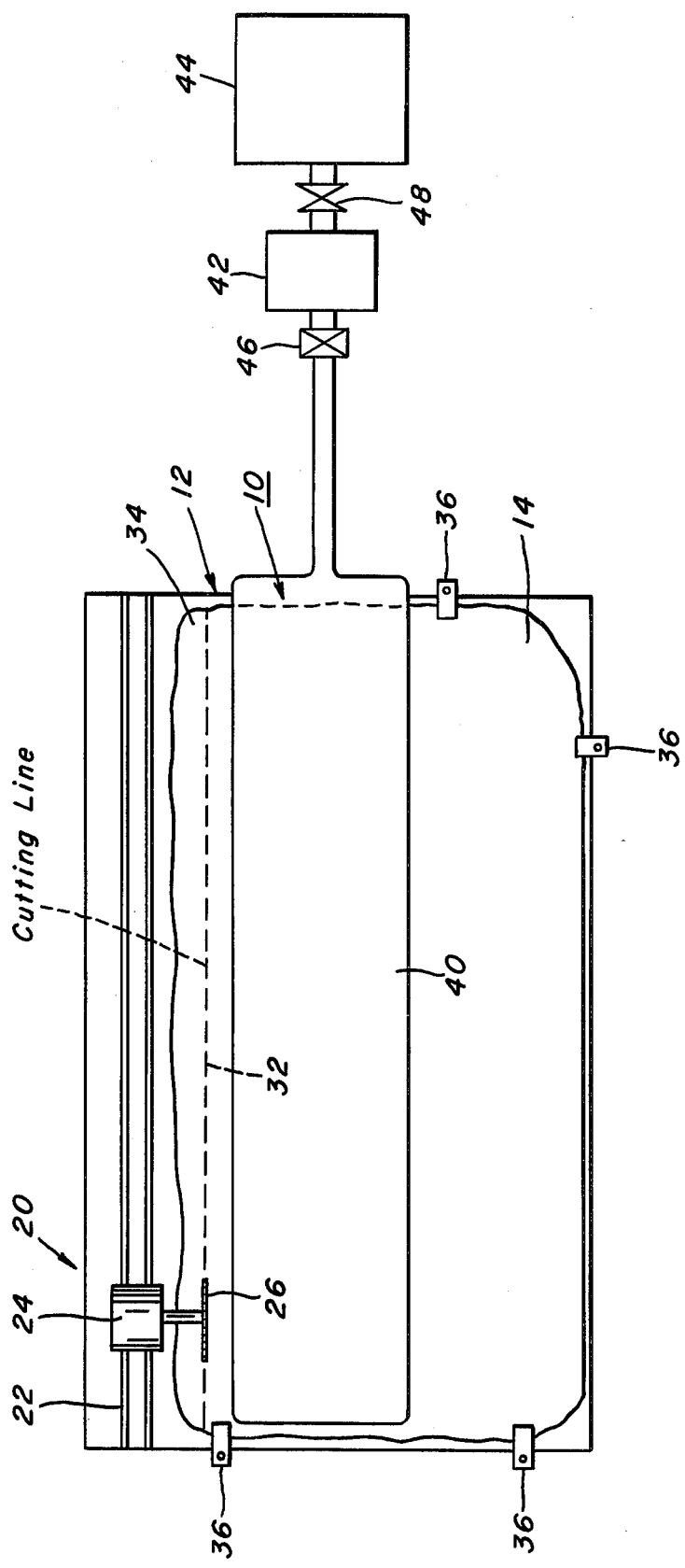
FIG. 3 is a schematic view showing the flexible container in its horizontally expanded condition placed onto a plate to be cut with an abrasive cutting wheel. The dashed line shows the cutting line.

Referring to the drawings and in particular FIGS. 1 to 3 which show a plate hold-down device 10 for use with a plate cutting apparatus 12 to cut plate 14.

Plate cutting apparatus 12 includes a cutting device 20, a table with a plate table top 30 to support plate 14. Cutting device 20 comprises a track 22 for carrying an abrasive cutter 24 having an abrasive cutting wheel 26. Table top 12 is supported by a base 28 and is positioned adjacent to track 22. Plate 14 is shown with a dotted line 32 along which it is to be cut by means of the abrasive cutting wheel 26 so as to remove portion 34 from plate 14. Table top 30 is shown with four clamps 36 to clamp plate 14 and thereby hold it onto the cutting table top 30. Clamps 36 may be eliminated where movement of the plate as a result of the weight thereof is no problem.

Plate hold down device 10 includes an expansible and retractable flexible container 40, and it is shown in its spirally wound and non-extended condition in FIG. 1 and in its extended condition in FIGS. 2 and 3. Container 40 is adapted to be filled with a fluid such as a liquid to expand it from its non-extended condition. Plate hold down device 10 also includes a reversible liquid pump 42 connected to a liquid storage or supply tank 44. A three position pump switch 46 is provided so as to activate pump 42 and cause it to inflate container 40, and a safety valve 48 is provided between pump 42 and liquid storage tank or supply 44 so as to permit the liquid supply 44 to be disconnected from pump 42.

Container 40 is formed from material suitable to contain the liquid to be inserted and is in flow communication with pump 42, and pump 42 is in flow communication with the liquid storage tank 44. Switch 46 in one portion activates pump 42 to pump fluid into expansible container 40 to expand the same, in a second position stops, and in a third position reverses pump 42 to exhaust the fluid from expansible container 40 and pump it back into the liquid supply 44. If desired, a sump can be provided to empty the liquid from pump 42 in an emergency situation. In addition, if there is no desire to recirculate the liquid back to the liquid supply 44, a sump can be provided to dump the liquid from container 40 after it has been retracted. However, with the present invention, it is possible to recirculate the liquid and use will be made of the sump only in an emergency situation. An example of a fluid which can be used to carry out the invention is water which is readily available and simple to handle.

Referring now to FIG. 4 of the drawings, plate hold down device 10 includes a bellows-type expansible and retractable container 140. In all other respects, the FIG. 4 embodiment is similar to the FIGS. 1 to 3 embodiment.

In FIG. 5, a side-by-side arrangement of bellows-type containers 140 is shown each connected with a separate pump 42 through pump switch 46, safety valve 48 to a single fluid supply 44. While only a single fluid supply has been shown, two separate fluid supplies may be used. Moreover, as separate safety valves 48 are provided and separate pump switches 46 are provided, each bellows-type container 140 is separably operable and expansible and retractable.

It will be obvious that while only two expansible containers 140 have been shown, depending upon the width of the plates and the width of the expansible and retractable containers being used, will determine the number of containers to be placed in the side-by-side arrangement.

Bellows-type container 140 is provided with an outward portion 50 and inner portion 52 so as to provide for a rippled configuration in cross section in its unexpanded or contracted condition. Bellows-type container 140 when expanded and filled with the liquid develops a bottom portion or surface 54 which is substantially flat and follows the contour of metal plate 14 as a result of the weight of the liquid on bottom portion 54. A traverse rod-type of system 56 which includes a winch 58 may be provides so as to assist the movement of bellows-type container 140 as it is filled with liquid and moved along the table on top of plate 14. Traverse rod system 56 includes a track 60 which carries rollers 62 connected with a cord or chain 64 suitably fixed to winch 58 at a fixed connection 66. Bellows-type container 140 is connected by means of connecting arm 68 to rollers 62. Winch 58 is suitably geared by means of gearing and other connection means as exemplified by shaft 70 for rotation in response to high volume, low pressure reversible pump 42. As the bellows-type container is filled with liquid by pump 42, winch 58 is also rotated so as to move rollers 62 along track 60 and assist in the movement of the bellows over plate 14. In a similar manner as pump 42 is exhausted, winch 58 is rotated in an opposite direction and moves rollers 62 along track 60 to withdraw the container from the cutting plate 14.

While clamps 36 may be used initially to hold the plate in place, they do not perform a holding function after the liquid filled bellows-type container is placed onto the plate.

The present system includes apparatus for rapidly circulating a liquid into the container for placement thereof onto plate 14 and weight it down as well as rapidly removing the liquid from the container. The liquid filled container can be placed very close to and parallel to line of cut 32 and thereby provide a uniformly continuous clamping close to and along the line of cut.

Because of the weight of the liquid on the plate, the bow may be removed from thin plates. And, for thicker plates, while the entire bow may not be removed, the base of the bag uniformly conforms to the surface of the plate and provides a uniformly continuous hold-down effect rather than a point hold-down effect which is obtained when edge clamps are used. This materially reduces or eliminates plate vibrations.

While there has been shown what is considered to be the preferred embodiments of the invention, it will be obvious that various changes and modifications may be made therein without departing from the spirit and scope of the invention.

I claim:

1. A plate hold down device for use with an apparatus for cutting metal plates having a support therefor and guide means for moving an abrasive cutting wheel along a line of cut for a metal plate positioned onto the support comprising:
   a flexible expansible and contractable hold-down device closed at one end and open at the other end and adapted to be filled with a liquid and moved onto the surface of the metal plate for holding the plate on said table, means mounting said hold-down device adjacent said support, said hold-down device being movable from a contracted condition out of surface contact with the metal plate to an expanded condition into surface contact with the metal plate, and
   liquid supply and withdrawal means in flow communication with the open end of said hold-down device for supplying liquid thereto to increase the weight thereof and moving said hold-down device into said expanded condition in surface contact with the metal plate adjacent said line of cut and hold the plate to said support to damp and absorb plate vibrations and for exhausting the liquid from said hold-down device to decrease the weight thereof and for removal thereof from the metal plate and adjacent to said support.

2. The device as set forth in claim 1, wherein
   said hold-down device includes a container having an interior adapted to receive the liquid supplied by said liquid supply means,
   said container having a bellows-type outer configuration in its contracted condition, the weight of the liquid supplied to said container being sufficient to flatten the portion of the bellows in its expanded condition in contact with the metal plate.

3. The device as set forth in claim 1, wherein
   said hold-down device includes a spirally wound container in its contracted condition,
   said container having a substantially smooth, flexible base in its expanded condition in contact with the metal plate.

4. The device as set forth in claim 1, including means connected with said hold-down device and operatively associated with said liquid supply and withdrawal means for assisting in the movement of said hold-down device.

5. A hold-down device for a plate during cutting thereof to absorb and damp plate vibrations, comprising:
   means for supporting said plate in a generally horizontal position;

a flexible hollow container being spirally wound in a contracted position and flexible in an expanded condition;

said container having an open end and a closed end, and moving means for delivering and removing liquid from said container through said open end;

means mounting said container adjacent one end of said plate for movement to a spirally wound contracted position at one end of a plate on said support means when liquid is removed therefrom and to an expanded position resting on said plate when filled with liquid; and said container having a substantial width in contact with said plate in its expanded position.

6. The device as set forth in claim 4, said moving means including:

reversible pump means connected with said container, liquid supply means connected with said pump means for supplying liquid thereto; and switch means coupled to said pump means and said container for switching said pump to pump liquid into said container and to reverse said pump to exhaust the liquid from said container.

7. The device as set forth in claim 6, including a side-by-side arrangement of a pair of said containers, and a reversible pump and switch means for each said container.

8. The device as set forth in claim 5, said flexible container is of bellows-type and having a rippled configuration in cross-section in its contracted condition;

said bellows-type container being formed of a non-plate marring material; and said moving means including means coupled to said container to assist in the movement of said container from its contracted condition to its expanded condition and from its expanded condition to its contracted condition.

9. The device as set forth in claim 5, said moving means including means coupling a liquid into said expansible and retractable means for expansion thereof and increasing the weight thereof; and said container being flexible with a non-marring outer surface and in its expanded condition providing a uniform conforming surface in contact with the plate.

* * * * *